United States Patent
Hug et al.

(10) Patent No.: US 7,377,207 B2
(45) Date of Patent: May 27, 2008

(54) DEVICE FOR PREPARING A BEVERAGE

(75) Inventors: Karl Hug, Vinzel-Suisse (CH);
Jean-Luc Denisart, Cully-Suisse (CH);
Jean-Paul Denisart, La Conversion-Suisse (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/523,272

(22) PCT Filed: Aug. 5, 2003

(86) PCT No.: PCT/EO03/08634

§ 371 (c)(1),
(2), (4) Date: Jan. 31, 2005

(87) PCT Pub. No.: WO2004/014205

PCT Pub. Date: Feb. 19, 2004

(65) Prior Publication Data

US 2005/0241486 A1    Nov. 3, 2005

(30) Foreign Application Priority Data

Aug. 6, 2002    (CH)    .................................... 1367/02

(51) Int. Cl.
*A47J 31/36*    (2006.01)
(52) U.S. Cl. ..................... 99/287; 99/289 P; 99/302 P
(58) Field of Classification Search ................. 99/280, 99/281, 287–303, 495; 141/82, 88, 231, 141/359, 98; 222/64, 321.9, 481, 137, 109, 222/320, 386, 405; 248/97, 99; 137/264
See application file for complete search history.

(56) References Cited

U.S. PATENT DOCUMENTS

| | | | | |
|---|---|---|---|---|
| 2,744,469 A | * | 5/1956 | Schaefer ...................... | 417/435 |
| 3,228,571 A | * | 1/1966 | O'Donnell et al. ...... | 222/321.9 |
| 3,270,918 A | * | 9/1966 | Goodrich et al. ............. | 222/64 |
| 3,356,011 A | * | 12/1967 | Parraga .................... | 99/289 R |
| 3,661,305 A | * | 5/1972 | Frahn et al. ................. | 222/481 |
| 3,918,355 A | * | 11/1975 | Weber ......................... | 99/283 |
| 4,150,769 A | * | 4/1979 | James ........................ | 222/137 |
| 4,389,925 A | * | 6/1983 | Piana ....................... | 99/289 R |
| 4,739,904 A | * | 4/1988 | Spencer et al. ............. | 222/109 |
| 4,763,566 A | * | 8/1988 | Paoletti .................... | 99/302 P |
| 4,890,653 A | | 1/1990 | Sartulairi | |
| 5,082,034 A | * | 1/1992 | Soper .......................... | 141/88 |

(Continued)

FOREIGN PATENT DOCUMENTS

EP    0 512 148    11/1992

(Continued)

*Primary Examiner*—Timothy F. Simone
(74) *Attorney, Agent, or Firm*—Bell, Boyd & Lloyd LLP

(57) ABSTRACT

The invention relates to a device for preparing a beverage, comprising:—a water reservoir (1);—a chamber (5) that is connected to said reservoir for delivering water;—means (17) for filling said chamber with water;—means (16) for emptying water from the chamber;—a compressed gas reservoir (2) with a three-way valve (4) for displacing said means so as to empty the chamber; and—a conduit (14) for conveying the water from the chamber to an extraction head.

21 Claims, 4 Drawing Sheets

U.S. PATENT DOCUMENTS

| | | | | |
|---|---|---|---|---|
| 5,271,589 A | * | 12/1993 | Belous | 248/97 |
| 6,025,000 A | | 2/2000 | Fond et al. | |
| 6,253,664 B1 | * | 7/2001 | Giannelli | 99/302 P |
| 6,662,975 B1 | * | 12/2003 | Bressani | 222/320 |

FOREIGN PATENT DOCUMENTS

| | | |
|---|---|---|
| EP | 0 602 203 | 6/1994 |
| GB | 778 394 A | 7/1957 |
| WO | 99/02081 | 1/1999 |

* cited by examiner

DEVICE FOR PREPARING A BEVERAGE

BACKGROUND OF THE INVENTION

The present invention relates to a device for preparing a beverage, said device having no pump.

In the technical field, there are already pump-less coffee machines for preparing beverages. Patent application WO 99/02081 relates to a system of this type for preparing a beverage from a displaceable cart. This system is based on the principle that the displacement of hot water is generated by means of a compressed-gas cylinder. The drawback of this device is that it is heavy and expensive. Furthermore, in this device, the water and the pressurized-gas are in permanent contact, which leads to the gas diffusing into the water and producing sparkling water. This has an adverse effect on the taste of the beverage, in this instance on the coffee extracted.

SUMMARY OF THE INVENTION

An object of the present invention is to provide the consumer with a relatively lightweight, inexpensive device for preparing cups of coffee or other beverages with well-defined volumes, without adverse effects on taste.

The present invention relates to a device for preparing a beverage, comprising:
a water reservoir;
a chamber connected to said reservoir for delivering water;
means for filling said chamber with water;
means for emptying water from said chamber;
a compressed-gas reservoir with a three-way valve for displacing said means so as to empty said chamber; and
a conduit conveying the water from said chamber to above an extraction head.

"Extraction head" is understood to mean, in the present description, any system based either on the dissolution of a material, or based on extraction, for example of tea, coffee and other substances. In the case of extraction, use is made of capsules, for example open capsules of the filter-paper-capsule type, or, also, of capsules forming the subject of patents in the name of the applicant, specifically EP 512 148 and EP 602 203. The capsules may contain any type of soluble or extractable food product, for example roasted, ground coffee, soluble coffee, soluble cocoa, tea, dried substances for bouillons, or the like.

The chamber for delivering water has a volume of between 10 and 1000 cc, preferably between 50 and 150 cc. The volume of the chamber is considered relative to the volume of the cupful to be prepared for the consumer.

The means for emptying water from the chamber are means using the pressure of the gas in order to empty said chamber. These means are preferably hydraulic means. As hydraulic means, use is preferably made of a piston displaced by compressed gas.

The means for filling said chamber with water are gravitation means or mechanical means. "Gravitation means" is understood to mean simply that the water fills the chamber under its own weight and pushes the piston, for example, back up. "Mechanical means" is understood to mean either a spring, or a motor or a manual means.

The compressed gas is chosen from the group consisting of air, $CO_2$ or nitrogen monoxide.

The water reservoir is a thermally-insulated hot-water reservoir. Provision may also be made in one embodiment for a heating system to surround the chamber. It is also possible to make provision for a heating system between the chamber and the extraction head.

The shape of the chamber is not of critical importance. Preferably, the chamber has a substantially cylindrical shape.

A further advantage of the device according to the invention is that it is virtually silent.

Additional features and advantages of the present invention are described in, and will be apparent from, the following Detailed Description of the Invention and the figures.

BRIEF DESCRIPTION OF THE FIGURES

The remainder of the description is given with reference to the drawings, in which.

DETAILED DESCRIPTION OF THE INVENTION

Figure 1:
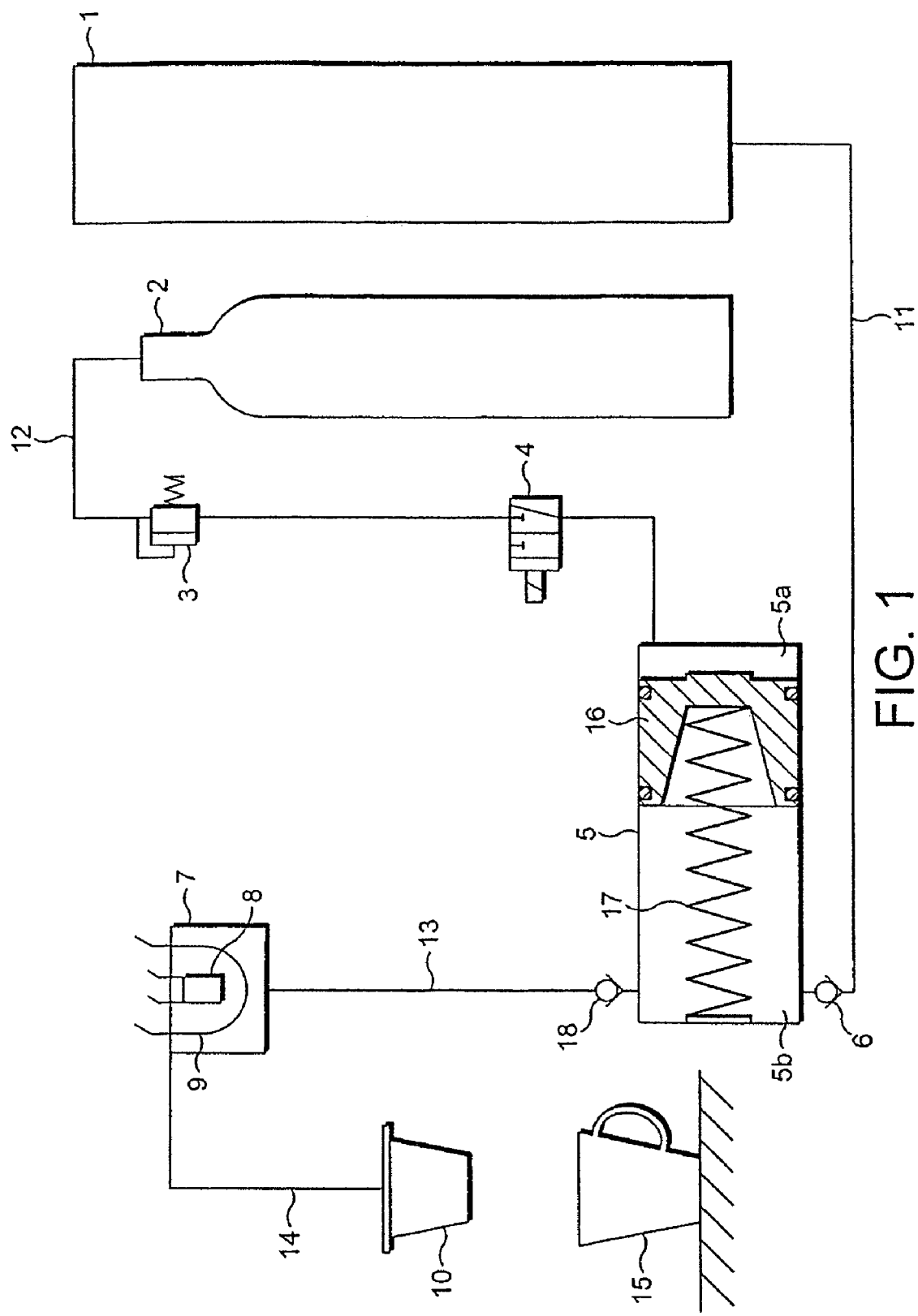
FIG. 1 is a representation of the device in a first embodiment.
Figure 2:
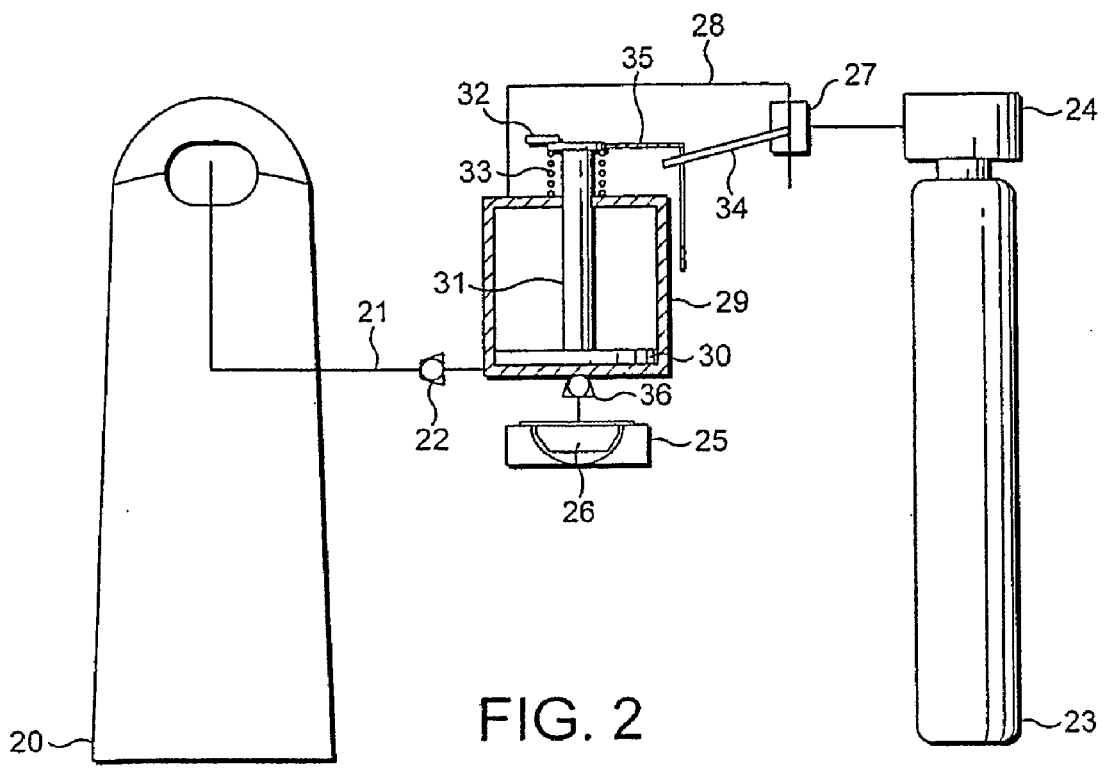
FIGS. 2 to 5 are diagrammatic representations of the device in a second embodiment.

The device comprises a water reservoir (1), a chamber (5) connected to said reservoir via the conduit (11), a heating system (7), a compressed-gas reservoir (2) and an extraction head (10). The chamber (5) comprises a piston (16) moved by a spring (17). The chamber (5) has a side (5a) for delivering compressed gas and a side (5b) for the entry of water. The compressed-gas reservoir (2) is connected via the conduit (12) to the side (5a) and said conduit comprises a purge (3) and a valve (4). The non-return valve (6) prevents any reflux of water from the chamber (5). The conduit (13) leads to the heating system, which comprises a thermostat (8) and a heating body (9). The conduit (4) leads to the extraction head.

The device operates as follows:

When the consumer wishes to make himself a coffee, the valve (4) is opened and placed in communication with the ambient air. As the side (5a) empties of air, the spring (17) relaxes and draws water from the water reservoir (1) to the side (5b). When the side (5b) is full, the valve (4) is placed in a position in which there is a link to the compressed-gas reservoir (2): the gas expands by virtue of (3) and displaces the piston (16) so as to displace the mass of water in the side (5b). The water passes via the non-return valve (18) into the heating system (7) and via the extraction head (10). The coffee is delivered to the cup (15). The machine is then ready for the next extraction.

The device in FIGS. 2 to 5 comprises a thermally-insulated hot-water reservoir (20), a chamber (29) connected to said reservoir via the conduit (21) that comprises a non-return valve (22), a compressed-gas reservoir (23), with expander (24), connected to the chamber (29) via the conduit (28). The three-way valve (27) allows the compressed gas to be introduced into the chamber (29) or connection to the outside pressure. The chamber (29) comprises a piston (30) with the latter's rod (31), and a valve release (35). The mechanical trigger (32) immobilizes the piston in a position in which the spring (33) is compressed. After the exit from the chamber (29) there is the capsule (26) to be extracted arranged in the cartridge holder (25).

Figure 3:
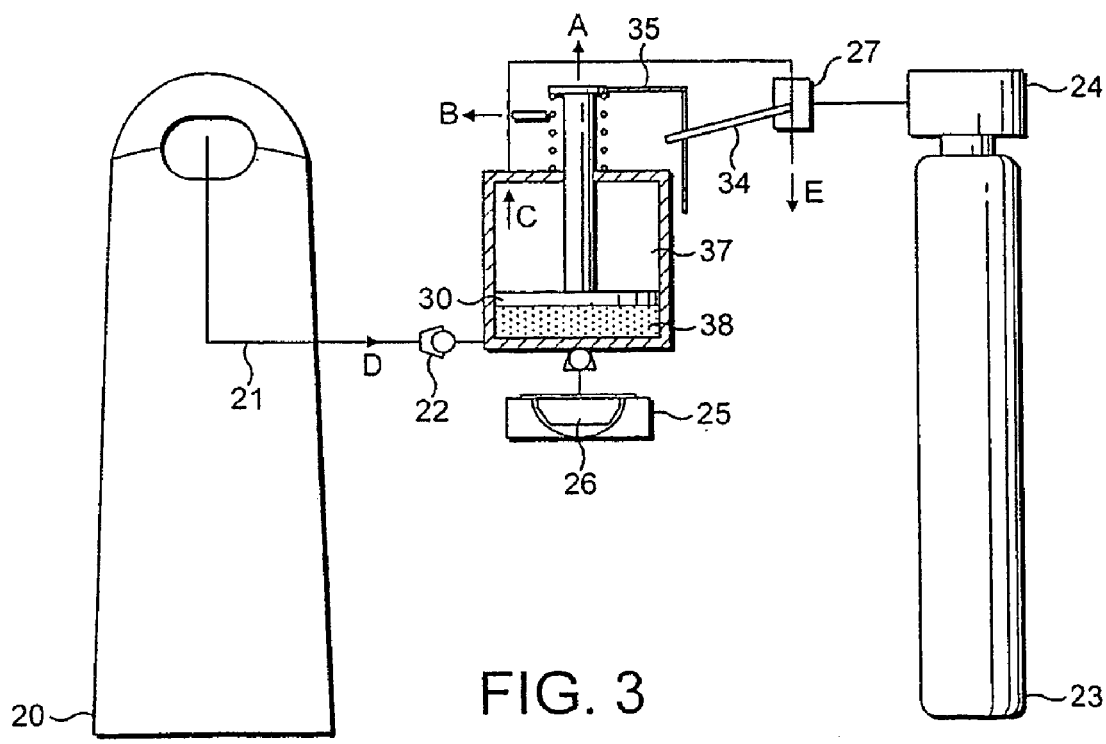
Figure 4:
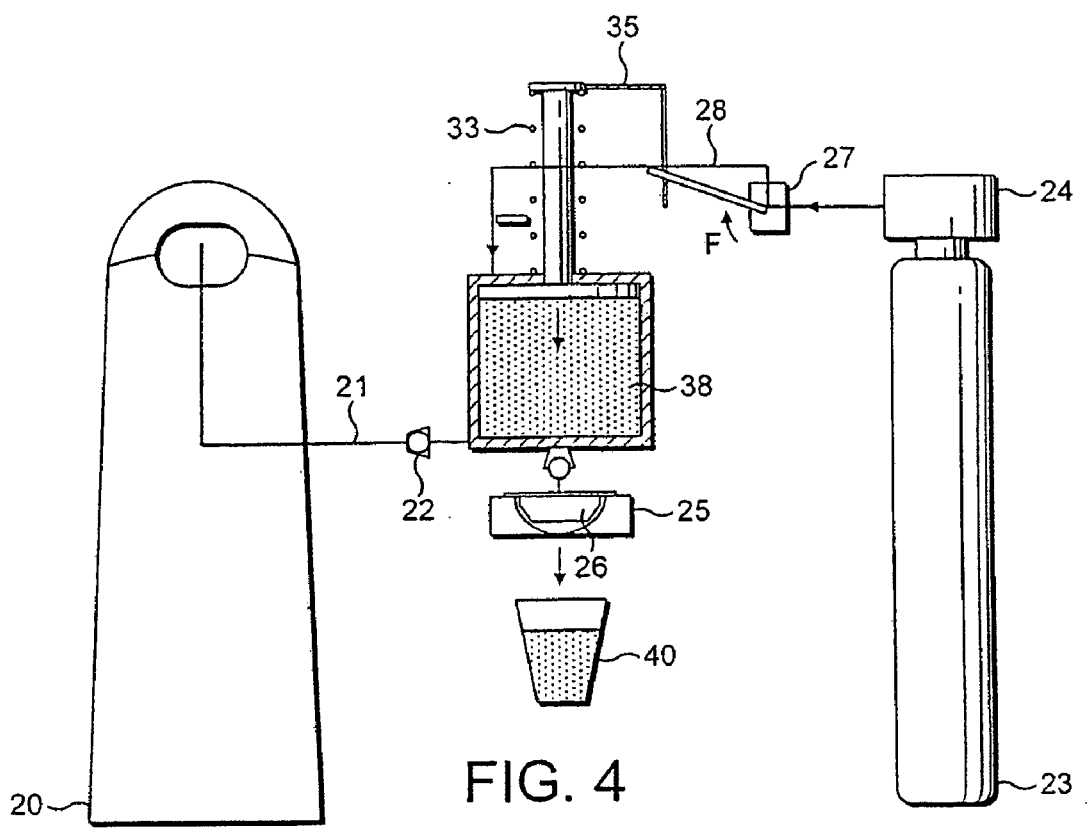
Figure 5:
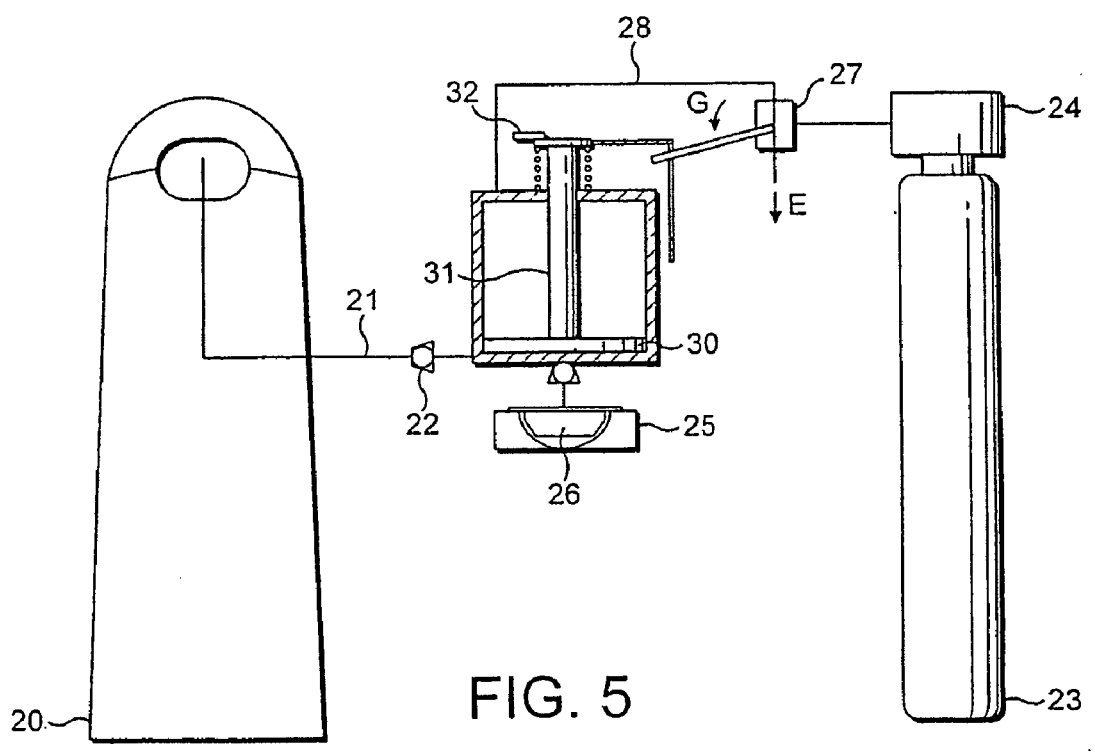

The device operates as follows:

When the consumer wishes to make himself a coffee, he disengages the trigger (32) in the direction of the arrow B, which allows the spring (33) to relax (FIG. 3). The piston (30) rises in the direction of the arrow A. The air present at (37) exits in the direction of the arrow C in the conduit (28) and is evacuated via the valve (27) to the outside (arrow E). The water in the reservoir (20) is drawn through the valve (22) at (38). When the piston (30) rises, the valve release (35) pushes the rod (34) of the valve in the direction of the arrow F until there is no longer any air at (37) and a maximum volume is achieved for (38). At this point, the valve (27) rocks in order to allow the compressed gas to enter via the release (24) through the conduit (28) in order to push the piston (30). The volume of hot water at (38) opens the valve (36), arrives at the capsule (26) and the coffee flows into the cup (40). During extraction, the piston draws the rod (34) downward in the direction of the arrow G. At the end of the piston's travel (FIG. 5), the valve (27) restores atmospheric pressure in the volume (37) and the trigger (32) again immobilizes the piston with the compressed spring (33). The machine is then ready for a further extraction. Provision may be made for a reservoir (20) having a volume of the order of 1 or 2 liters. The compressed-gas reservoir (23) normally has a volume of the order of . . . L. The volume (38) corresponds to a cup volume of the order of 100 cc.

Figure 6:
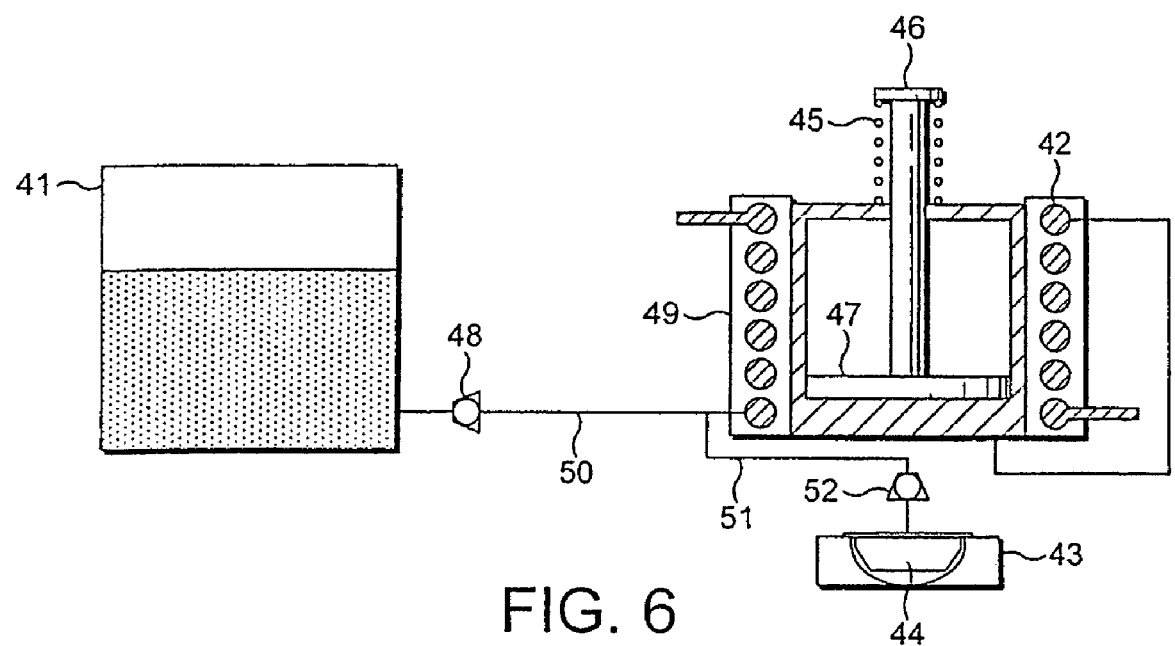
FIG. 6 is a diagrammatic representation according to a third embodiment.

In the embodiment of FIG. 6, instead of hot water being provided, provision is made for a reservoir (41) containing cold water and a heating body (42). There is still a chamber (49) with a piston (47), a piston rod (46), a spring (45), a capsule (44) and a cartridge holder (43).

Operation is the same as previously, except that the heating body (42) will heat the cold water arriving via the conduit (50) through the valve (48) and arriving in the chamber (49). When the piston is in the high position, the compressed air (not shown) pushes the cold water into the conduit (51) through the valve (52) over the capsule (44). The coffee is recovered in a cup placed below.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A device for preparing a beverage, comprising:
   a water reservoir;
   an extraction head;
   a chamber having a volume connected to said reservoir for being filled with water from the reservoir and for delivering water to the extraction head;
   a conduit for conveying the water from said chamber to the extraction head;
   a piston in the chamber for emptying water from said chamber;
   a compressed-gas reservoir and a valve selectively allowing compressed gas to displace the piston so as to empty the chamber of water and restoring atmospheric pressure in the volume of the chamber for filling of said volume from the reservoir.

2. The device as claimed in claim 1, wherein the chamber has a volume of between 10 and 1000 cc.

3. The device as claimed in claim 1, wherein the chamber is filled with water by gravitation means.

4. The device as claimed in claim 1, wherein the gas is chosen from the group consisting of air, $CO_2$ and nitrogen monoxide.

5. The device as claimed in claim 1, wherein the extraction head is a head for pre-measured filter-paper capsules.

6. The device as claimed in claim 1, wherein the water reservoir is a thermally-insulated hot-water reservoir.

7. The device as claimed in claim 1, comprising a heating system surrounding the chamber.

8. The device as claimed in claim 1, comprising a heating system between the chamber and the extraction head.

9. The device as claimed in claim 1, wherein the chamber has a substantially cylindrical shape.

10. The device as claimed in claim 1, wherein the chamber has a volume of between 50 and 150 cc.

11. The device as claimed in claim 1, wherein filling said chamber with water is done by mechanical means.

12. The device as claimed in claim 1, wherein the extraction head is a head for sealed capsules.

13. A device for preparing a beverage, comprising:
    a water reservoir;
    an extraction head;
    a chamber having a volume coupled to said reservoir;
    a conduit conveying the water from said chamber to the extraction head;
    a piston in the chamber for emptying water from said chamber;
    a compressed-gas reservoir and a three-way valve allowing compressed gas to displace the piston so as to empty the chamber of water and restoring atmospheric pressure in the volume of the chamber for filling of said volume from the reservoir.

14. The device as claimed in claim 13, wherein the chamber has a volume of between 10 and 1000 cc.

15. The device as claimed in claim 13, wherein the chamber is filled with water by gravitation means.

16. The device as claimed in claim 13, wherein the gas is chosen from the group consisting of air, $CO_2$ and nitrogen monoxide.

17. The device as claimed in claim 13, wherein the extraction head is a head for pre-measured filter-paper capsules or sealed capsules.

18. The device as claimed in claim 13, wherein the water reservoir is a thermally-insulated hot-water reservoir.

19. The device as claimed in claim 13, comprising a heating system surrounding the chamber.

20. The device as claimed in claim 13, comprising a heating system between the chamber and the extraction head.

21. The device as claimed in claim 13, wherein the chamber has a substantially cylindrical shape.

* * * * *